Dec. 8, 1964     C. FRANK     3,160,188
THREADED INSERT FOR BLIND HOLE
Filed March 9, 1962
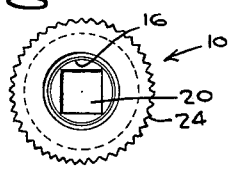
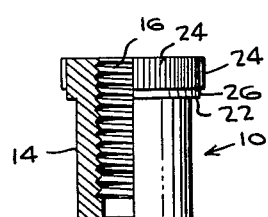
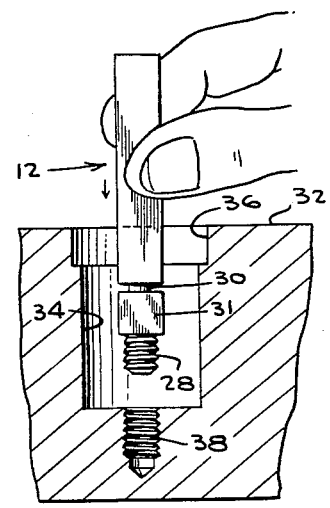
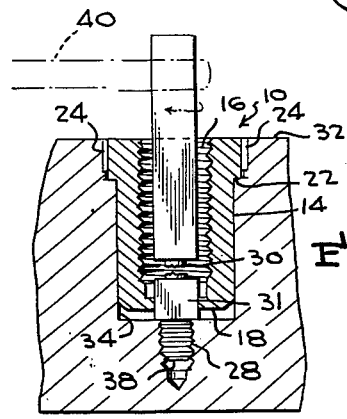
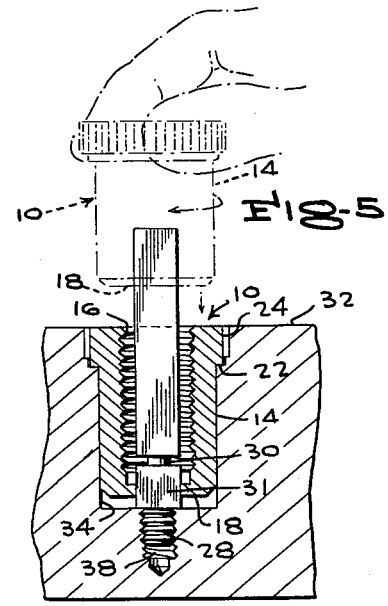
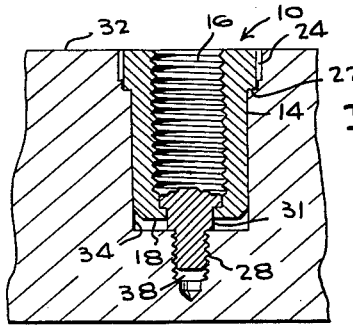
INVENTOR.
CHARLES FRANK
BY
McMorrow, Berman & Davidson
ATTORNEYS United States Patent Office 3,160,188
Patented Dec. 8, 1964

3,160,188
THREADED INSERT FOR BLIND HOLE
Charles Frank, 436 New Lots Ave., Brooklyn 7, N.Y.
Filed Mar. 9, 1962, Ser. No. 178,683
4 Claims. (Cl. 151—41.73)

This invention relates to the provision of durable threads in a body of low-strength material, and in particular to an auxiliary piece having internal threads and adapted to be fitted in a blind bore and locked in place.

In the case of relatively soft materials, such as magnesium and aluminum alloys and plastics, threads produced in the parent material are not, in many cases, possessed of the required strength for the tasks demanded, and as a consequence, stripping occurs after a number of applied torques, in mounting and removing screws.

It is therefore a general object of the invention to eliminate the aforementioned difficulties by providing a threaded insert having the required strength and reliability. Another object is to provide an insert of this nature, which does not have external threads. A further object is to provide a threaded insert which can be applied without the need for special tools. A still further object is to provide an insert which may be securely installed, and which cannot be rotated, or pulled out, under normal conditions, without destruction of the material of the main body, or of the insert itself.

These and other ends, which will be readily apparent, are attained by the present invention, which may be briefly described as comprising a cup-form insert with internal threads, a square bottom opening, and a splined, upper flange or collar, in association with a square rod slidable in the bottom opening, and having a threaded end, and a reduced neck portion, the threaded end being engageable in a threaded, reduced bore in the bottom of a bore sized to receive the cup, and the rod adapted for shearing rupture at the neck upon tightening of the thread, and the portion of the rod left in the cup being adapted for upsetting, to lock the cup in place in the bore.

For a more detailed description, reference is made to the following specification, as illustrated in the drawing, in which:

FIGURE 1 is a bracketed view, in perspective, showing the cup insert, and the associated rod with rupturable, threaded end, FIGURE 2 is a top plan view of the cup insert, FIGURE 3 is an elevational view of the cup insert, partially in section along a radial plane, FIGURE 4 is an axial sectional view through a blind bore in a body, showing the rod with threaded end, positioned for insertion in a threaded bore in the bottom of the blind bore, FIGURE 5 is a view similar to FIGURE 4, showing the end of the rod threaded into its receiving bore, and the cup insert press-fitted into place in the main bore, the cup insert, as positioned prior to deposit in the bore being indicated in broken lines, FIGURE 6 is a view similar to FIGURE 5, showing the rod as ruptured at the neck, due to increased torque after full tightening of the threaded end, the wrench applying the torque being indicated in broken lines, and FIGURE 7 is a view similar to FIGURE 6, with the rod removed, and the retained fragment thereof upset, to lock the cup insert in place, the said fragment being shown in axial section.

Referring to the drawing by characters of reference, there is shown, in FIGURE 1, a cup insert 10, and a rod 12 of square cross section. Referring additionally to FIGURES 2 and 3, the cup 10 is seen as comprising a tubular main body 14, with internal threading 16, and a flat bottom 18 having a central, square opening 20, formed as by broaching. At its top, the cup 10 has an outwardly extending, annular flange 22, with splines or serrations 24, parallel to the cup axis. Below the splines, the flange 22 is relieved by an annular rabbet 26, for a purpose to be later explained.

The rod 12, which is dimensioned for snug, sliding movement in opening 20 in the bottom of cup 10, has a reduced and threaded, lower end 28, and has a reduced, circular neck portion 30, at a distance above the threaded portion about equal to the length of the threaded portion, leaving a head section 31 above the threaded portion.

The foregoing represents all parts of the adaptor. In use, as with a body 32, shown in FIGURES 4 to 7, the body is provided with a bore 34, sized to receive the tubular body 14 of cup 10 in a slip fit, and having a counterbore 36 of a depth equal to that of flange 22 of the cup, so that when the underside of the flange rests on the bottom or shelf of the counterbore, the top of the cup is flush with the outer surface of the body 32. To guarantee this seating, the bore 34 has sufficient depth to avoid contact by the bottom 18 of cup 10. The diameter of the counterbore 36 is slightly less than the maximum diameter of the splined portion of the cup, so that the splines cut their way into the wall of the counterbore during insertion of the cup, and therefore effectively hold the cup against rotation. The corner notch 26 in the cup flange provides clearance for accommodation of chips cut out by the splines during entry.

The first step in the mounting of the adaptor is the fixation of threaded end 28 of the rod in cavity 34, and for this purpose the cavity is provided with a threaded bore 38 centrally in its bottom. In FIGURE 4, the rod is shown poised for deposit in the cavity, and in FIGURE 5, the threaded end is shown as lodged in the threaded bore 38. With the rod 12 thus in place, upright along the axis of cavity 34, the square opening 20 in the bottom of cup 10 is engaged on the rod, as indicated by the dotted line showing of the cup in FIGURE 5. With the fingers of the user engaged on the splined collar of the cup, a torque is applied clockwise, which locks the threads 38 of the rod in place, and thus puts the rod in its final position of rotation, in readiness to receive the cup in the cavity 34. Thereafter the cup is slid downward, and pressed into place, with the splines biting through the wall of counterbore 36, to give a final and positive lock against turning of the rod and loosening of its threaded anchorage. The parts, at this stage, are shown in solid lines in FIGURE 5. After the cup is in place, the rod 12 is engaged by a suitable wrench 40 (FIGURE 6), and torque applied to the rod until it shears at the neck 30. In this action, the splined connection of the cup assumes the torque load of the wrench prior to rupture, and thus prevents its transmission to the threaded end of the rod, which would cause excessive tightening of the threaded connection. After rupture, the upper portion of the rod is withdrawn, and the head 31 of the retained portion is upset, as by riveting, flowing over the inner face of the bottom 18 of the cup, and thus securely locking the cup against axial withdrawal forces. This renders the adaptation complete, and screws may be applied to and removed from the threaded bore 16 of the cup, without undue wear or stripping, or other damage.

It will be seen that the cup, which is installed by the simple sequence of mounting the rod, pressing the cup in, breaking off the rod and upsetting the retained portion, is proof against both rotation and axial movement, and the simple, threaded holder is also securely locked against any possibility of working loose. These features are in marked contrast to the situation obtaining, for instance, in a conventional type of adaptor which is, itself, secured in place by means of external threads.

The use of the long rod, with subsequent rupture, provides an accurate guide for the head, and avoids the necessity for precision placement of the head prior to cutting engagement of the splines.

Since the threads 28 are involved in only one use, the rod 12 may be of malleable material, such as an aluminum alloy, and this also renders the upsetting action more facile.

While rod 12 has been shown as square in cross section, and is so preferred, it may have other geometric forms, such as hexagonal, with opening 20 shaped and sized to correspond.

Although certain preferred embodiment has been shown and described, various modifications will become apparent, in the light of this disclosure, and the invention should not, therefore, be deemed as limited, except insofar as shall appear from the spirit and scope of the appended claims.

I claim:

1. An adaptor insert for receiving threaded fasteners, comprising, in combination, a cylindrical, tubular cup with a bottom wall having a square opening, said cup having internal threads, and an outwardly extending, annular flange at its top, said flange having external splines in a direction parallel to the axis of the cup and having an outer, annular, corner recess on its lower side, and a rod of square cross section adapted for a snug, sliding fit in said opening, and having a reduced, threaded end portion, and a reduced, circular neck portion spaced from said end portion a distance substantially the same as the length of said end portion.

2. An adaptor insert for receiving threaded fasteners, comprising, in combination, a cup with a bottom wall having a square opening, said cup having internal threads, and an outwardly extending, annular flange at its top, said flange having external splines in a direction parallel to the axis of the cup and having an outer, annular, corner recess on its lower side, and a rod of square cross section adapted for a snug, sliding fit in said opening, and having a reduced, threaded end portion, and a reduced, circular neck portion spaced from said end portion a distance substantially the same as the length of said end portion.

3. An adaptor insert for receiving threaded fasteners, comprising, a cup with a bottom wall having a square opening, said cup having internal threads, and an outwardly extending, annular flange at its top, said flange having external splines in a direction parallel to the axis of the cup, and a rod of square cross section adapted for a snug, sliding fit in said opening, and having a reduced, threaded end portion, and a reduced, circular neck portion spaced from said end portion a distance substantially the same as the length of said end portion.

4. The method of supplying threads in a body which comprises forming a bore in the body, with an outer counterbore and a reduced, threaded recess in its bottom, securing in said recess the threaded end of a rod of square cross section having a reduced neck adjacent said end, advancing into said bore an internally threaded cup, having a square opening in its bottom, by sliding said opening along said rod, press-fitting into said counterbore a splined flange on said cup, rupturing said rod at said neck by application of torque, and upsetting the top portion of the part of the rod remaining in the cup, to overlie the boundary of said opening.

References Cited in the file of this patent

UNITED STATES PATENTS

| | | |
|---|---|---|
| 1,106,273 | Backus | Aug. 4, 1914 |
| 1,432,243 | Harris | Oct. 17, 1922 |
| 1,814,703 | Johnson | July 14, 1931 |
| 1,884,491 | Ziemann | Oct. 25, 1932 |
| 2,466,013 | Eaton | Apr. 5, 1949 |

FOREIGN PATENTS

| | | |
|---|---|---|
| 766,184 | France | Apr. 9, 1933 |